(12) United States Patent
Riedijk et al.

(10) Patent No.: US 9,922,231 B1
(45) Date of Patent: Mar. 20, 2018

(54) FINGERPRINT SENSING WITH VOLTAGE PATTERN CONFIGURATIONS

(71) Applicant: Fingerprint Cards AB, Göteborg (SE)

(72) Inventors: Frank Riedijk, Delft (NL); Wouter Brevet, Delft (NL); Lars Christensen, Charlottenlund (DK); Søren Christensen, Dyssegaard (DK); Michael Hansen, Søborg (DK)

(73) Assignee: FINGERPRINT CARDS AB, Göteborg (SE)

(*) Notice: Subject to any disclaimer, the term of this patent is extended or adjusted under 35 U.S.C. 154(b) by 0 days.

(21) Appl. No.: 15/636,105

(22) Filed: Jun. 28, 2017

(30) Foreign Application Priority Data

Nov. 17, 2016 (SE) .................................. 16515033

(51) Int. Cl.
*G06K 9/00* (2006.01)

(52) U.S. Cl.
CPC ....... *G06K 9/0002* (2013.01); *G06K 9/00067* (2013.01)

(58) Field of Classification Search
CPC .......... G06K 9/0002; G06K 9/00067; G06K 9/0008; G06K 9/00087; G06K 9/0012; G06K 9/036
See application file for complete search history.

(56) References Cited

U.S. PATENT DOCUMENTS 7,864,992 B2  1/2011  Riedijk et al.
8,888,004 B2  11/2014 Setlak et al.
9,152,841 B1* 10/2015 Riedijk ............... G06K 9/0002
9,383,876 B2  7/2016  Riedijk et al.
(Continued)

FOREIGN PATENT DOCUMENTS

WO  2015147727 A1  10/2015
WO  2016130070 A1  8/2016

OTHER PUBLICATIONS

Nam, J., et al., "Design and Implementation of 160×192 Pixel Array Capacitive-Type Fingerprint Sensor", Circuits Systems Signal Processing, vol. 24, No. 4, pp. 401-413, 2005.
(Continued)

*Primary Examiner* — Ali Bayat
(74) *Attorney, Agent, or Firm* — RMCK Law Group PLC

(57) ABSTRACT

A method of determining a representation of a physical property of a finger using a finger sensing system comprising a two-dimensional measuring arrangement including a plurality of measuring elements, each defining a measuring element position in the measuring arrangement, and each comprising a finger electrode spaced apart from the finger by a dielectric structure. For each of the measuring element positions, the method comprises providing a measuring configuration in which the finger electrode of a sensing measuring element defining the measuring element position exhibits a sensing finger electrode potential; the finger electrode of a first different measuring element exhibits a first different finger electrode potential; and the finger electrode of a second different measuring element exhibits a second different finger electrode potential; acquiring a measurement value based on a sensing signal; and determining the representation of the physical property of the finger based on a plurality of measurement values.

14 Claims, 8 Drawing Sheets

(56) References Cited

U.S. PATENT DOCUMENTS

| | | | |
|---|---|---|---|
| 9,684,812 B2* | 6/2017 | Riedijk | G06K 9/0002 |
| 9,704,012 B2* | 7/2017 | Kravets | G06K 9/0002 |
| 9,747,489 B2* | 8/2017 | Mo | G06K 9/0002 |
| 2013/0181949 A1 | 7/2013 | Setlak | |
| 2015/0015537 A1 | 1/2015 | Riedijk et al. | |
| 2016/0104024 A1 | 4/2016 | Sløgedal et al. | |
| 2016/0180619 A1 | 6/2016 | Riedijk | |
| 2018/0012055 A1* | 1/2018 | Kravets | G06K 9/0002 |

OTHER PUBLICATIONS

Swedish Search Report for Application No. 1651503-3 dated May 24, 2017, 2 pages.

* cited by examiner

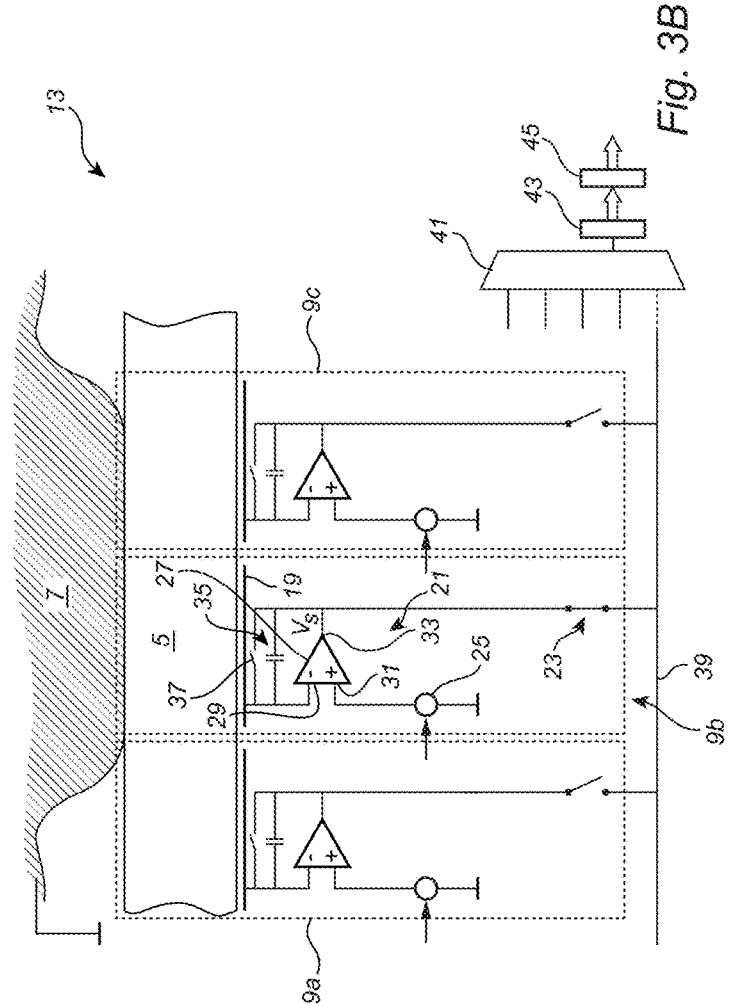

FINGERPRINT SENSING WITH VOLTAGE PATTERN CONFIGURATIONS

CROSS-REFERENCE TO RELATED APPLICATIONS

This application claims priority to Sweden Application No. 1651503-3, filed on Nov. 17, 2016, the disclosure of which is incorporated herein by reference in its entirety.

FIELD OF THE INVENTION

The present invention relates to a fingerprint sensing system and to a method of determining a physical property of a finger.

BACKGROUND OF THE INVENTION

Various types of biometric systems are used more and more in order to provide for increased security and/or enhanced user convenience.

In particular, fingerprint sensing systems have been adopted in, for example, consumer electronic devices, thanks to their small form factor, high performance and user acceptance.

Among the various available fingerprint sensing principles (such as capacitive, optical, acoustic, thermal etc), capacitive sensing is most commonly used, in particular in applications where size and power consumption are important issues.

Capacitive fingerprint sensors generally provide a measure indicative of the capacitance between each of several sensing structures and a finger placed on or moved across the surface of the fingerprint sensor.

Some capacitive fingerprint sensors passively read out the capacitance between the sensing structures and the finger. This, however, requires a relatively large capacitance between sensing structure and finger. Therefore such passive capacitive sensors are typically provided with a very thin protective layer covering the sensing structures, which makes such sensors rather sensitive to scratching and/or ESD (electro-static discharge).

U.S. Pat. No. 7,864,992 discloses a capacitive fingerprint sensing system in which a driving signal is injected into the finger by pulsing a conductive structure arranged in the vicinity of the sensor array and measuring the resulting change of the charge carried by the sensing structures in the sensor array.

This type of so-called active capacitive fingerprint sensing systems generally enables measurement of the capacitance between finger and sensing structures with a much higher signal-to-noise ratio than the above-mentioned passive systems. This, in turn, allows for a considerably thicker protective coating and thus for more robust capacitive fingerprint sensors that can be included in items subjected to considerable wear, such as mobile phones.

For even further increased robustness and ease of integration of the fingerprint sensor into electronic devices etc, it is, however, desirable to enable fingerprint sensing through a very thick dielectric structure, which may be several hundreds of microns thick. For instance, it may be desirable to enable fingerprint sensing through a glass plate or similar, such as the front glass cover of a mobile phone.

When sensing through such a thick dielectric structure, the actual resolution of the resulting fingerprint image may be reduced since the area of the finger seen by each sensing structure is increased.

To mitigate this problem, U.S. Pat. No. 8,888,004 proposes to reconstruct shape information from differential pixel measurements using a kernel-based reconstructing process.

Although the approach proposed by U.S. Pat. No. 8,888,004 may be potentially useful for sharpening the fingerprint image, the suggested solution requires the fingerprint sensor to be capable of programmable differential pixel measurements. Furthermore, the suggested solution is expected to be rater complex and difficult to implement in practice.

Further, it would be desirable to provide for the determination of another physical property of the finger than a representation of the fingerprint pattern, such as the moisture level at the finger surface or properties useable for identifying a spoof attempt.

SUMMARY

In view of the above-mentioned and other drawbacks of the prior art, it is an object of the present invention to provide for improved finger sensing, in particular through a thick dielectric structure.

According to a first aspect of the present invention, it is therefore provided a method of determining a representation of a physical property of a finger using a finger sensing system comprising: a two-dimensional measuring arrangement including a plurality of measuring elements, each defining a measuring element position in the measuring arrangement, and each comprising a finger electrode spaced apart from the finger by a dielectric structure; acquisition circuitry for acquiring measurement values from the measuring arrangement; and control circuitry for controlling operation of the finger sensing system, the method comprising the steps of: controlling, for each of the measuring element positions using the control circuitry, the measuring arrangement to provide a measuring configuration in which: the finger electrode of a sensing measuring element defining the measuring element position exhibits a sensing finger electrode potential, and the measuring arrangement provides a sensing signal indicative of a charge on the finger electrode of the sensing measuring element; the finger electrode of a first different measuring element at a first lateral distance from the measuring element position exhibits a first different finger electrode potential to provide a first potential difference between the sensing finger electrode potential and the first different finger electrode potential; and the finger electrode of a second different measuring element at a second lateral distance, greater than the first lateral distance, from the measuring element position exhibits a second different finger electrode potential to provide a second potential difference, different from the first potential difference, between the sensing finger electrode potential and the second different finger electrode potential; acquiring for each of the measuring element positions, using the acquisition circuitry, a measurement value based on the sensing signal provided by the measuring arrangement, resulting in a plurality of measurement values; and determining the representation of the physical property of the finger based on the plurality of measurement values.

The "physical property" of the finger may, for instance, be a representation of a fingerprint pattern, a presence or distribution of moisture, or an indication of electrical properties of the skin, etc.

In embodiments where the above-mentioned physical property is a representation of the fingerprint pattern of the finger, then the representation of the fingerprint pattern of the finger need not necessarily be a digital gray scale image, but may be any suitable representation from which fingerprint pattern information can be deduced. The representation of the fingerprint pattern may, for example, be raw fingerprint image data, or the data may have been processed and may then be provided in the form of conditioned image data, as fingerprint template data or in any other form.

The measuring elements may be arranged in any suitable two-dimensional measuring arrangement, such as a planar array in which the measuring elements are arranged in rows and columns. There may, however, be embodiments in which the measuring elements are not arranged in rows and columns.

The finger electrode of each measuring element may, for example, be provided in the form of a metal plate. It should, however, be noted that the finger electrode may be realized as any suitable electrically conductive structure. Each measuring element may be a differential measuring element. In such embodiments, each measuring element comprises at least two finger electrodes.

It should be noted that some (at least one) finger electrode potentials may be time-varying and that some finger electrode potentials may be constant.

For instance, the sensing finger electrode potential may be time-varying, and the first and second different finger electrode potentials may be substantially constant in relation to a reference potential of the measuring arrangement. Alternatively, the sensing finger electrode potential may be substantially constant, and the first and second different finger electrode potentials may be time-varying in relation to a reference potential of the measuring arrangement.

Furthermore, the second different measuring element is different from the first different measuring element.

In the context of the present application, the first potential difference should be understood to be defined by the first different finger electrode potential minus the sensing finger electrode potential, and the second potential difference should be understood to be defined by the second different finger electrode potential minus the sensing finger electrode potential, etc.

To provide the above-mentioned sensing signal, the measuring arrangement may comprise charge sensing circuitry. Such charge sensing circuitry may be comprised in each measuring element, or be common to a group of measuring elements, or all measuring elements.

The present invention is based on the realization that, for a given measuring element position, the capacitive couplings between the sensing measuring element defining the measuring element position and several different measuring elements can be used to estimate the capacitive coupling between the evaluated measuring element and the surface of the finger directly opposite the evaluated measuring element. A measure of this capacitive coupling may be referred to as a finger coupling value for the measuring element position.

The present inventors have further realized that the provision of different potential differences for different lateral distances between measuring elements can be used for shaping the electric field in such a way that the charge on the finger surface is effectively centered directly opposite the sensing measuring element. This, in turn, provides for acquisition of a sharper fingerprint image. Moreover, by providing different potentials to the first and second (and possibly further) different measuring elements, this sharper fingerprint image can be obtained in a single measurement operation, without the need to acquire and combine a series of fingerprint images.

In addition, the present inventors have found that other effects than image sharpening can be achieved with embodiments of the present invention, by selecting another set of potentials of the first and second (and possibly further) different measuring elements.

In other words, measuring elements in the vicinity of the sensing measuring element can be used to create a voltage pattern that will influence the relationship between one or several properties of the finger above the sensing measuring element and the sensing signal provided by the measuring arrangement for the measuring element position.

Using a larger number of different measuring elements at different measuring element positions, with different finger electrode potentials, will provide more information about the skin and will also allow an accurate estimation of the capacitive coupling between the sensing measuring element and the portion of the finger directly opposite (such as above) the measuring element position. However, already a voltage pattern formed by the above-mentioned sensing measuring element, and the first and second different measuring elements will provide more information than when all measuring elements, or all measuring elements except the sensing measuring element exhibit the same finger electrode potential.

According to various embodiments, the finger electrode of any additional measuring element, in the measuring configuration, closer to the sensing measuring element than the first different measuring element may exhibit the sensing finger electrode potential.

As was mentioned further above, a more extensive voltage pattern will improve the determination of the physical property of the finger, such as the representation of the fingerprint pattern.

According to embodiments, the measuring configuration may therefore be such that the finger electrode of a third different measuring element at a third lateral distance, greater than the second lateral distance, from the measuring element position exhibits a third different finger electrode potential to provide a third potential difference, different from the second potential difference, between the sensing finger electrode potential and the third different finger electrode potential.

According to various embodiments, furthermore, the measuring configuration may be such that at least one of the sensing finger electrode potential, the first different finger electrode potential and the second different finger electrode potential is time-varying in such a way that each of the first potential difference and the second potential difference is time-varying.

In particular, the first potential difference may be time-varying from being a first potential difference value at a first point in time to being a second potential difference value at a second point in time, and the step of acquiring, for each measuring element position, the measurement value may comprise sampling the sensing signal at the first point in time, and sampling the sensing signal at the second point in time. The second potential difference may advantageously be time-varying in the same manner.

When the potential differences between the potential of the finger electrode of the sensing measuring element and the potentials of the finger electrodes of the first and second different measuring element, respectively, are changed, the charge carried by the finger electrode of the sensing measuring element will also change. The change in the charge, resulting from a known change in potential difference, is an indication of the capacitive coupling between the finger electrode of the sensing measuring element and the finger electrodes of the first and second (and possibly further) different measuring elements, through a dielectric structure including the protective dielectric structure and the finger placed on top of the protective dielectric structure.

Further, by taking the difference between the sampled values before and after the change in potential difference, the influence of common mode noise can be reduced.

According to embodiments, the first potential difference may advantageously have a first polarity, and the second potential difference may have a second polarity, opposite to the first polarity.

In embodiments where a third different measuring element is additionally used for forming the above-discussed voltage pattern, the finger electrode of this third different measuring element may advantageously exhibit a third different finger electrode potential providing a third potential difference having the first polarity.

It has been found that a voltage pattern resulting in different potential differences for different lateral distances from the sensing measuring element may be effective at least for increasing the sharpness of the fingerprint image, and also for detecting and imaging moisture on the finger surface.

According to a second aspect of the present invention, there is provided a finger sensing system for determining a physical property of a finger, the finger sensing system comprising: a two-dimensional measuring arrangement including a plurality of measuring elements, each defining a measuring element position in the measuring arrangement, and each comprising a finger electrode spaced apart from the finger by a dielectric structure; control circuitry connected to the measuring arrangement for: controlling, for each of the measuring element positions, the measuring arrangement to provide a measuring configuration in which: the finger electrode of a sensing measuring element defining the measuring element position exhibits a sensing finger electrode potential, and the measuring arrangement provides a sensing signal indicative of a charge on the finger electrode of the sensing measuring element; the finger electrode of a first different measuring element at a first lateral distance from the measuring element position exhibits a first different finger electrode potential to provide a first potential difference between the sensing finger electrode potential and the first different finger electrode potential; and the finger electrode of a second different measuring element at a second lateral distance, greater than the first lateral distance, from the measuring element position exhibits a second different finger electrode potential to provide a second potential difference, different from the first potential difference, between the sensing finger electrode potential and the second different finger electrode potential; and acquisition circuitry connected to the measuring arrangement for: acquiring for each of the measuring element positions, a measurement value based on the sensing signal provided by the measuring arrangement, resulting in a plurality of measurement values; and determining the representation of the physical property of the finger based on the plurality of measurement values.

Each of the control circuitry and the acquisition circuitry may be implemented in hardware, software or a combination of hardware and software. Furthermore, the two-dimensional measuring arrangement may be included in a fingerprint sensor component, and at least a portion of the control circuitry and/or the acquisition circuitry may be included in such a fingerprint sensor component.

According to various embodiments, each measuring element in the measuring arrangement may be controllable to provide a sensing signal. In other words, each measuring element may be controllable between at least a first state in which the measuring element provides a sensing signal and the finger electrode of the measuring element exhibits a given potential and a second state in which the measuring element does not provide a sensing signal and the finger electrode of the measuring element exhibits another potential different from the above-mentioned given potential. Advantageously, each measuring element may further be controllable to a third state in which the measuring element does not provide a sensing signal and the finger electrode of the measuring element exhibits the given potential. This third state may be referred to as a "non-sensing" state.

According to various embodiments, each measuring element in the measuring arrangement may comprise: a charge amplifier comprising: a first input; a second input; an output capacitively coupled to the first input; and at least one amplifier stage between the first and second inputs, and the output.

In a charge amplifier, the potential at the first input (often referred to as the 'negative' input) will follow the potential at the second input (often referred to as the 'positive' input). In other words, a change in the potential at the second input results in a substantially corresponding change in the potential at the first input. Depending on the actual configuration of the charge amplifier, the potential at the first input may be substantially the same as the potential at the second input, or there may be a substantially constant potential difference between the first and second inputs. If, for instance, the amplifier stage in the charge amplifier is a single stage amplifier with a single sense transistor, the potential difference may be the gate-source voltage of the sense transistor.

According to various embodiments, furthermore, the finger sensing system may additionally comprise excitation signal providing circuitry for achieving the above-mentioned first and second potential differences and/or for providing an excitation signal to the finger and/or to a reference potential plane of the measuring arrangement.

In embodiments, the excitation signal providing circuitry may be connected to the second input of each of the charge amplifiers and configured to selectively change a potential at the second input, to thereby change a potential of the finger electrode.

The excitation signal providing circuitry could be switching circuitry configured to switch between two or more different potentials provided on different lines. Alternatively, or in combination, the excitation signal providing circuitry may comprise at least one signal source configured to provide a time-varying potential, such as a square wave voltage signal or a sine wave voltage signal.

The finger sensing system according to various embodiments of the present invention may, moreover, advantageously be included in an electronic device further comprising processing circuitry configured to: acquire a representation of the fingerprint pattern from the fingerprint sensing system; authenticate a user based on the representation; and perform at least one user-requested process only if the user is authenticated based on the representation. The electronic device may, for example, be a handheld communication device, such as a mobile phone or a tablet, a computer, or an electronic wearable item such as a watch or similar.

Further embodiments of, and effects obtained through this second aspect of the present invention are largely analogous to those described above for the first aspect of the invention.

In summary, the present invention relates to a method of determining a representation of a physical property of a finger using a finger sensing system comprising a two-dimensional measuring arrangement including a plurality of measuring elements, each defining a measuring element position in the measuring arrangement, and each comprising a finger electrode spaced apart from the finger by a dielectric structure. For each of the measuring element positions, the method comprises providing a measuring configuration in which the finger electrode of a sensing measuring element defining the measuring element position exhibits a sensing finger electrode potential; the finger electrode of a first different measuring element exhibits a first different finger electrode potential; and the finger electrode of a second different measuring element exhibits a second different finger electrode potential; acquiring a measurement value based on a sensing signal; and determining the representation of the physical property of the finger based on a plurality of measurement values.

BRIEF DESCRIPTION OF THE DRAWINGS

These and other aspects of the present invention will now be described in more detail, with reference to the appended drawings showing an example embodiment of the invention, wherein:

FIG. 3B is a schematic cross-section view of a portion of the fingerprint sensing system in FIG. 3A;

DETAILED DESCRIPTION OF EXAMPLE EMBODIMENTS

In the present detailed description, various embodiments of the finger sensing system and method according to the present invention are mainly described with reference to a fingerprint sensing system and method in which first, second and third different measuring element are arranged spaced apart from the sensing measuring element on the same side of the sensing measuring element.

It should be noted that this by no means limits the scope defined by the appended claims, which equally well includes, for example, finger sensing systems and methods with first and second (and possibly further) different measuring elements arranged on several sides of the sensing measuring element.

Furthermore, in the embodiments described herein, the finger electrodes of the measuring elements providing the sensing signals are kept at a constant potential in relation to a sensor ground potential, while time-varying potentials are provided to the first different measuring element and the second different measuring element (and the third different measuring element), in order to achieve the desired potential differences. It should be noted that the desired potential differences may be achieved in other ways. For instance, a time-varying potential may be provided to the finger electrodes of the measuring elements providing the sensing signals, as is described in U.S. Pat. No. 9,152,841, which is hereby incorporated by reference, in its entirety. Alternatively, or in combination, a time-varying reference potential may be provided to the finger sensor, and a time-varying potential may be provided, in anti-phase, to the measuring elements not providing the sensing signal. This potential providing scheme is described in detail in U.S. Pat. No. 9,383,876, which is hereby incorporated by reference, in its entirety.

Figure 1:
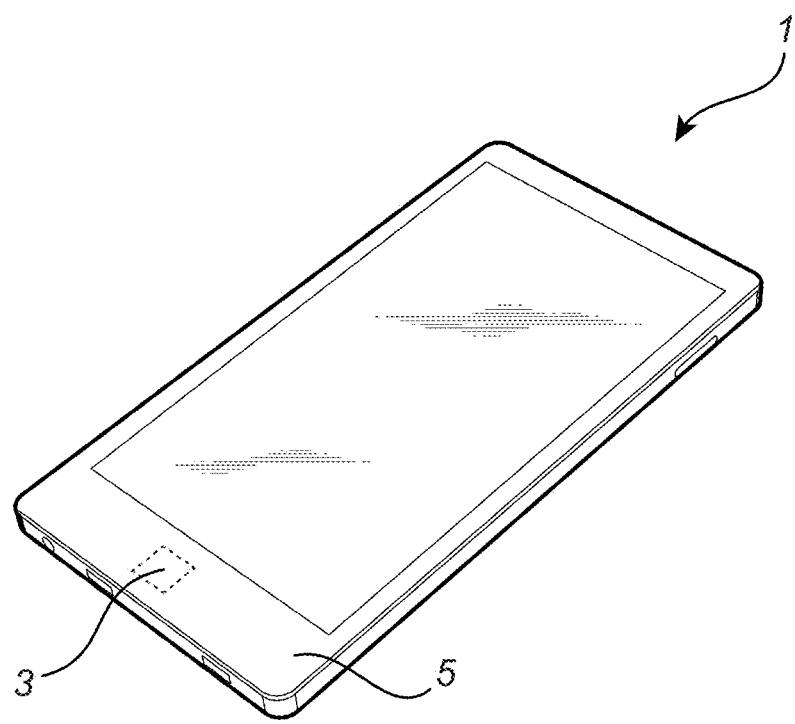
FIG. 1 schematically shows an electronic device comprising a capacitive fingerprint sensor under a cover glass.

FIG. 1 schematically illustrates an application for a finger sensing device according to an example embodiment of the present invention, in the form of a mobile phone 1 with an integrated fingerprint sensing system 3. The fingerprint sensing system 3 may, for example, be used for unlocking the mobile phone 1 and/or for authorizing transactions carried out using the mobile phone, etc. As is schematically indicated in FIG. 1, the fingerprint sensing system 3 is arranged under a cover glass 5 of the mobile phone, which may, for instance, be in the range of 0.2-0.5 mm thick.

Figure 2A:
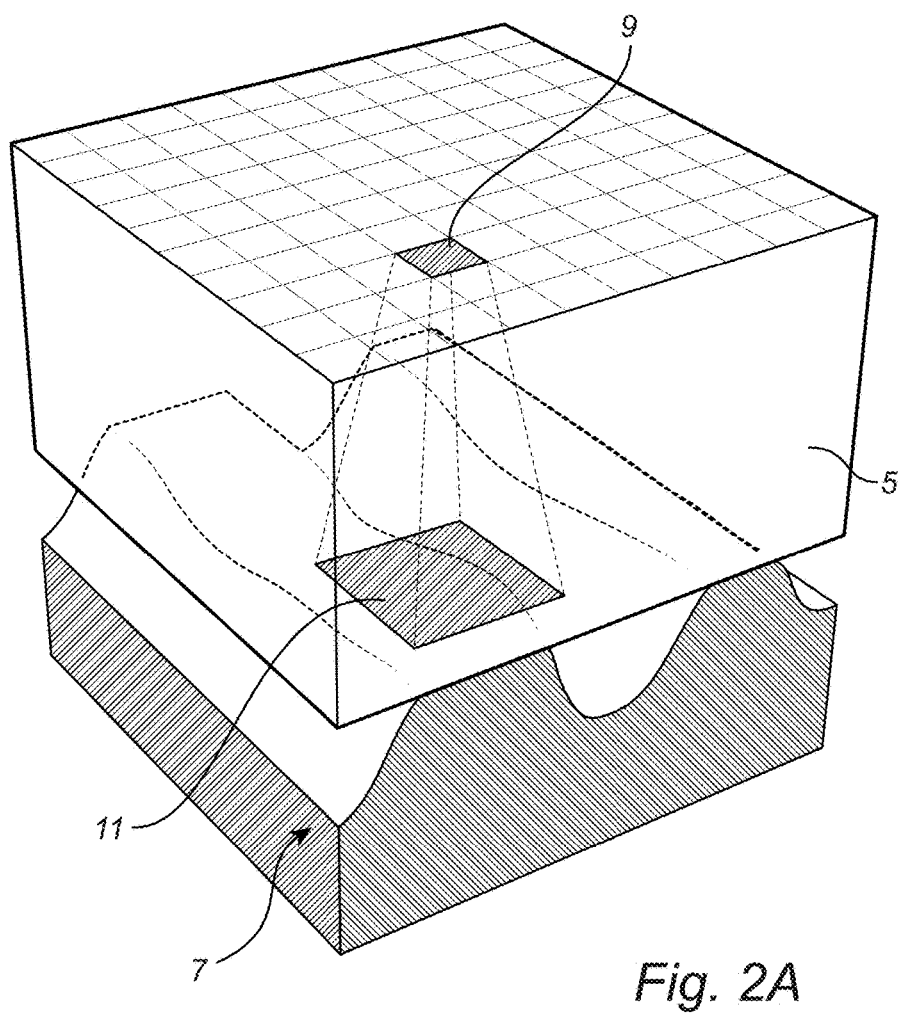
FIG. 2A is a schematic illustration of the portion of the finger surface imaged by a single sensing element using a known capacitive sensing technique.

FIG. 2A is a perspective view of a portion of a finger surface 7 in contact with the cover glass 5 in FIG. 1. On the sensor side of the cover glass 5 in FIG. 2A, areas corresponding to the measuring elements 9 of the fingerprint sensor are schematically indicated. The dimensions of the cover glass 5, the finger surface 7, and the measuring element 9 areas in FIG. 2A are approximately to scale for an example embodiment of the finger sensing system according to the present invention.

In conventional fingerprint sensing system applications, where the dielectric structure covering the sensor surface is rather thin, such as about 0.1 mm or less, the area of the finger surface sensed by a given measuring element is not very different from the area of the measuring element. This also applies to known fingerprint sensing configurations where a protective structure (such as sapphire) with dielectric anisotropy and/or a very high dielectric constant is used.

With thicker dielectric protective coatings (in particular coatings that do not exhibit dielectric anisotropy and/or a very high dielectric constant), known capacitive measurement techniques will perform spatial averaging with every measuring element, as is schematically indicated in FIG. 2A, where the finger area 11 sensed by a given measuring element 9 is schematically indicated.

With known capacitive measurement techniques, this spatial averaging will result in a blurry or defocused fingerprint image.

Figure 2B:
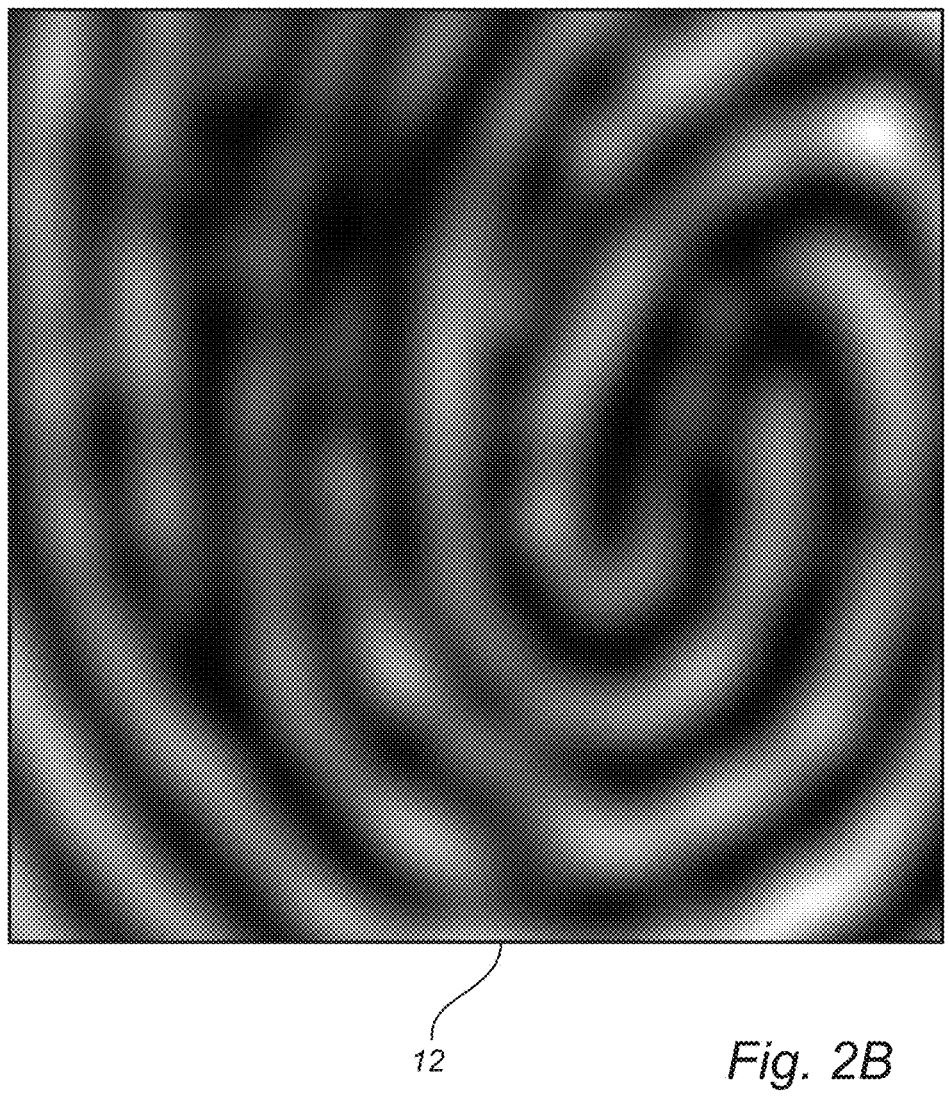
FIG. 2B is an illustration of an example simulated fingerprint image resulting from the sensing configuration in FIG. 2A using a known capacitive sensing technique.

An example of such a blurry fingerprint image 12 is shown in FIG. 2B, which is the result of a simulation of the sensing configuration in FIG. 2A using a known capacitive sensing technique.

Figure 3A:
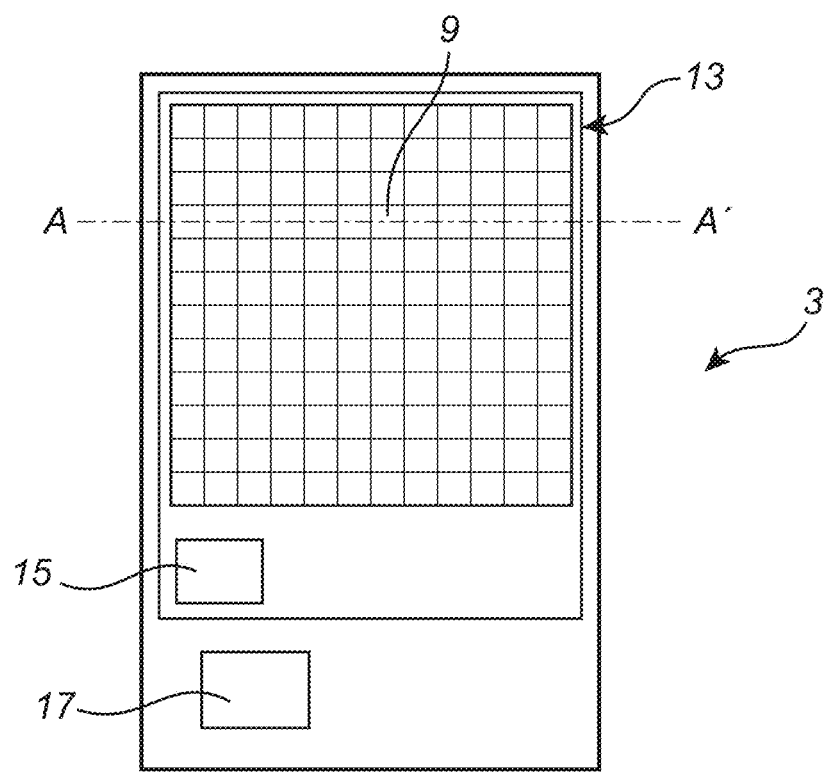
FIG. 3A is a schematic block diagram of a fingerprint system according to an embodiment of the present invention.

FIG. 3A is a schematic block diagram of a finger system 3 according to an embodiment of the present invention. Referring to FIG. 3A, the finger sensing system 3 according to this example embodiment of the invention comprises a two-dimensional measuring arrangement 13, including a plurality of measuring elements 9, measurement control circuitry in the form of a sensor controller 15, and acquisition circuitry 17. The measuring elements 9 will be described in greater detail below with reference to FIG. 3B, which is a circuit schematic cross-section view of a portion of the measuring arrangement 13 in the section indicated by the line A-A' in FIG. 2A.

In this context, it should be noted that the illustration in FIG. 3A is schematic and simplified. In an actual finger sensing system according to embodiments of the present invention, the measuring arrangement would typically comprise a considerably larger number of measuring elements. Furthermore, a typical pitch of the array of measuring elements may be around 50 µm, for a 500 pixel per inch sensor.

Furthermore, the fingerprint sensing system 3 is here schematically indicated as a single component, or a system in a package. It should, however, be understood that the functionality of the fingerprint sensing system 3 may be distributed among several components and/or software modules, such as a fingerprint sensor component and a host processor, which may be a so-called trusted element, or a so-called secure element. The functionality of the fingerprint sensing system 3 may also be partly distributed between such a trusted element and such a secure element.

FIG. 3B is a schematic cross-section view of a portion of the fingerprint sensing system in FIG. 3A, with a finger 7 placed on top of the measuring arrangement 13. The measuring arrangement 13 comprises a plurality of measuring elements 9a-c.

As is schematically shown in FIG. 3B, each measuring element 9a-c (reference numerals are only indicated for one of the measuring elements to avoid cluttering the drawings) comprises a protective dielectric top layer 5, a conductive finger electrode 19 underneath the protective dielectric top layer 5, a charge amplifier 21, selection circuitry, here functionally illustrated as a simple selection switch 23 for allowing acquisition of a sensing signal from the measuring element 9a-c, and finger electrode potential providing circuitry 25 for controllably providing a selected electrical potential (constant or time-varying) to the finger electrode 19 as will be described in greater detail further below.

The charge amplifier 21 comprises at least one amplifier stage, here schematically illustrated as an operational amplifier (op amp) 27 having a first input (negative input) 29 connected to the finger electrode 19, a second input (positive input) 31 connected to the finger electrode potential providing circuitry 25, and an output 33. In addition, the charge amplifier 21 comprises a feedback capacitor 35 connected between the first input 29 and the output 33, and reset circuitry, here functionally illustrated as a switch 37, for allowing controllable discharge of the feedback capacitor 35. The charge amplifier 21 may be reset by operating the reset circuitry 37 to discharge the feedback capacitor 35.

As is often the case for an op amp 27, the electrical potential at the first input 29 follows the electrical potential applied to the second input 31. Depending on the particular amplifier configuration, the potential at the first input 29 may be substantially the same as the potential at the second input 31, or there may be a substantially fixed offset between the potential at the first input 29 and the potential at the second input 31.

Using the finger electrode potential providing circuitry 25, a desired electrical potential, which may be time-varying or substantially constant in relation to a reference potential, can be provided to the finger electrode.

The finger electrode potential providing circuitry 25 may, for instance, be implemented as a number of controllable switches for controllably connecting the second input 31 to a selected voltage line carrying the desired electrical potential to be provided to the finger electrode. Alternatively, the finger electrode potential providing circuitry may be directly connectable to the finger electrode 19, to directly provide the desired electrical potential to the finger electrode.

Through control of the finger electrode potential providing circuitry 25, the finger electrode 19 can thus be provided with a chosen potential depending on the desired function of the particular measuring element 9 as will be described in greater detail further below.

When a given measuring element, say the center measuring element 9b in FIG. 3B, is to function as a sensing measuring element, the finger electrode potential providing circuitry 25 of the center measuring element 9b may, for example, be controlled to provide a substantially constant sensing finger electrode potential, in relation to a sensor ground potential, to the second input 31. At the same time, the finger electrode potential providing circuits of one or both of the neighboring measuring elements 9a, 9c may be controlled to provide a first different finger electrode potential to the second inputs of the neighboring measuring elements 9a, 9c. This first different sensing finger electrode potential may be time-varying in relation to a sensor ground potential. As will be described further below, the finger electrode potential providing circuitry of one or several second different measuring elements at a second lateral distance from the sensing measuring element 9b are controlled to provide a second different finger electrode potential to the finger electrode(s) of that (those) second different measuring element(s). The sensing finger electrode potential, and the first and second different finger electrode potentials together provide a voltage pattern. As was explained further above, this voltage pattern influences the capacitive coupling between the skin of the finger and the finger electrode of the sensing measuring element.

In FIG. 3B, the finger 7 is schematically indicated as being "grounded". It should be understood that the finger "ground" may be different from the sensor ground. For instance, the finger 7 may be at the ground potential of the electronic device 1 in which the fingerprint sensing system 3 is included. Alternatively, the body may be considered to have such a large electrical "mass" that the potential of the finger remains substantially constant when the potential of a finger electrode 19 varies.

The above-described change in potential difference between the finger electrode 19 of the sensing measuring element 9b, and the finger electrodes of the neighboring measuring elements 9a, 9c (and the other measuring elements contributing to the above-described voltage pattern), results in a sensing signal Vs on the output 33 of the charge amplifier 21.

When the indicated sensing element 9b is controlled to be a sensing measuring element, the selection switch 23 is closed to connect the output 33 of the charge amplifier 21 to the readout line 39. The readout line 39, which may be a common readout line for a row or a column of the 2D measuring arrangement 13, is shown in FIG. 3B to be connected to a multiplexer 41. As is schematically indicated in FIG. 3B, additional readout lines providing sensing signals from other rows/columns of the measuring arrangement 13 are also connected to the multiplexer 41.

The sensing signals Vs from the sensing measuring element 9b are demodulated by sample-and-hold circuitry 43. The output of the sample-and-hold circuitry 43 is connected to an analog-to-digital converter 45 for converting the analog DC voltage signals output by the sample-and-hold circuitry to a digital representation of the measurement value for each selected sensing measuring element 9b.

Figure 4:
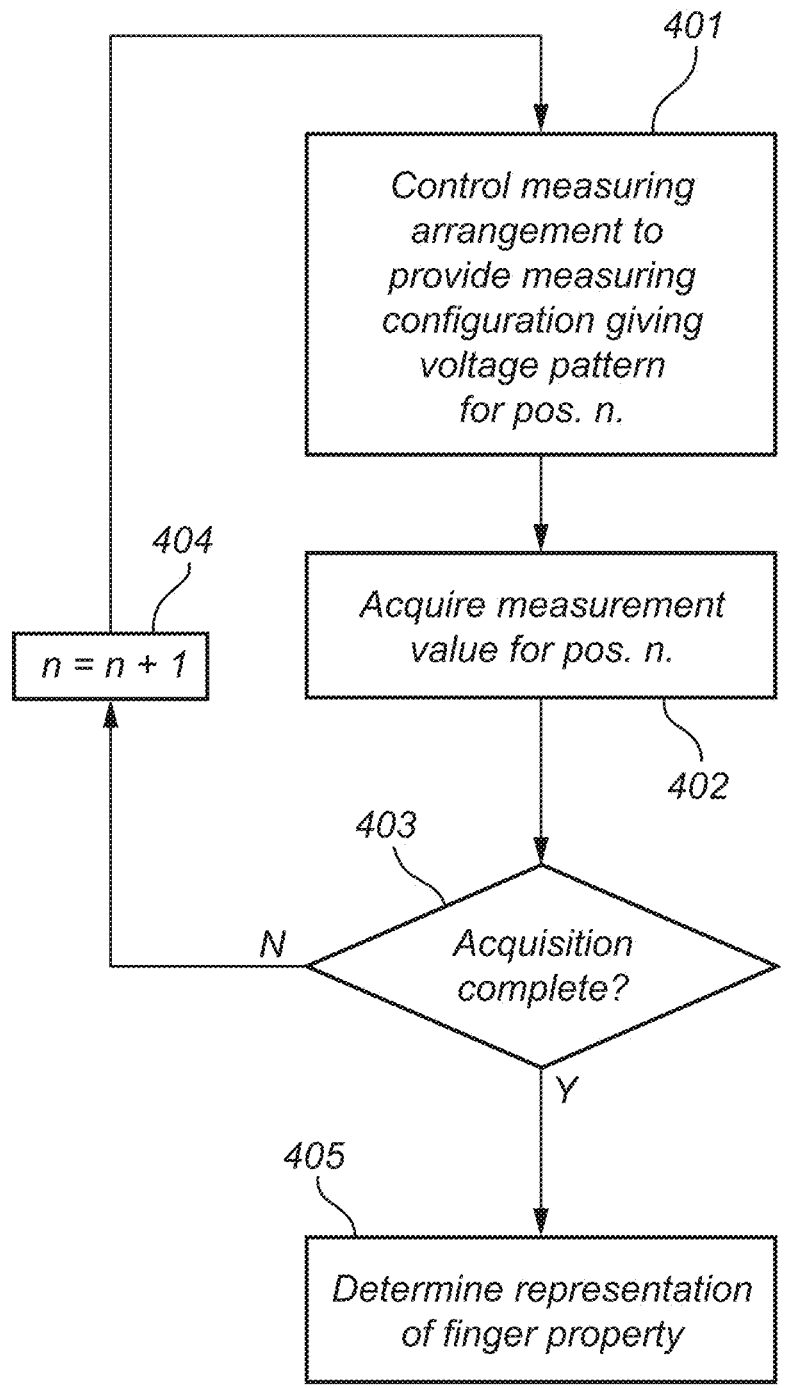
FIG. 4 is a flow-chart illustrating a method according to an example embodiment of the present invention.

Having now introduced an embodiment of the fingerprint sensing system of the present invention, an example embodiment of the method according to the present invention will be described below with reference to the flow-chart in FIG. 4, and additional illustrations where indicated.

In the first step 401, for measuring element position n, the measuring arrangement 13 is controlled by the sensor controller 15 to provide a measuring configuration which results in a voltage pattern for sensing at the measuring element position n.

Figure 5A:
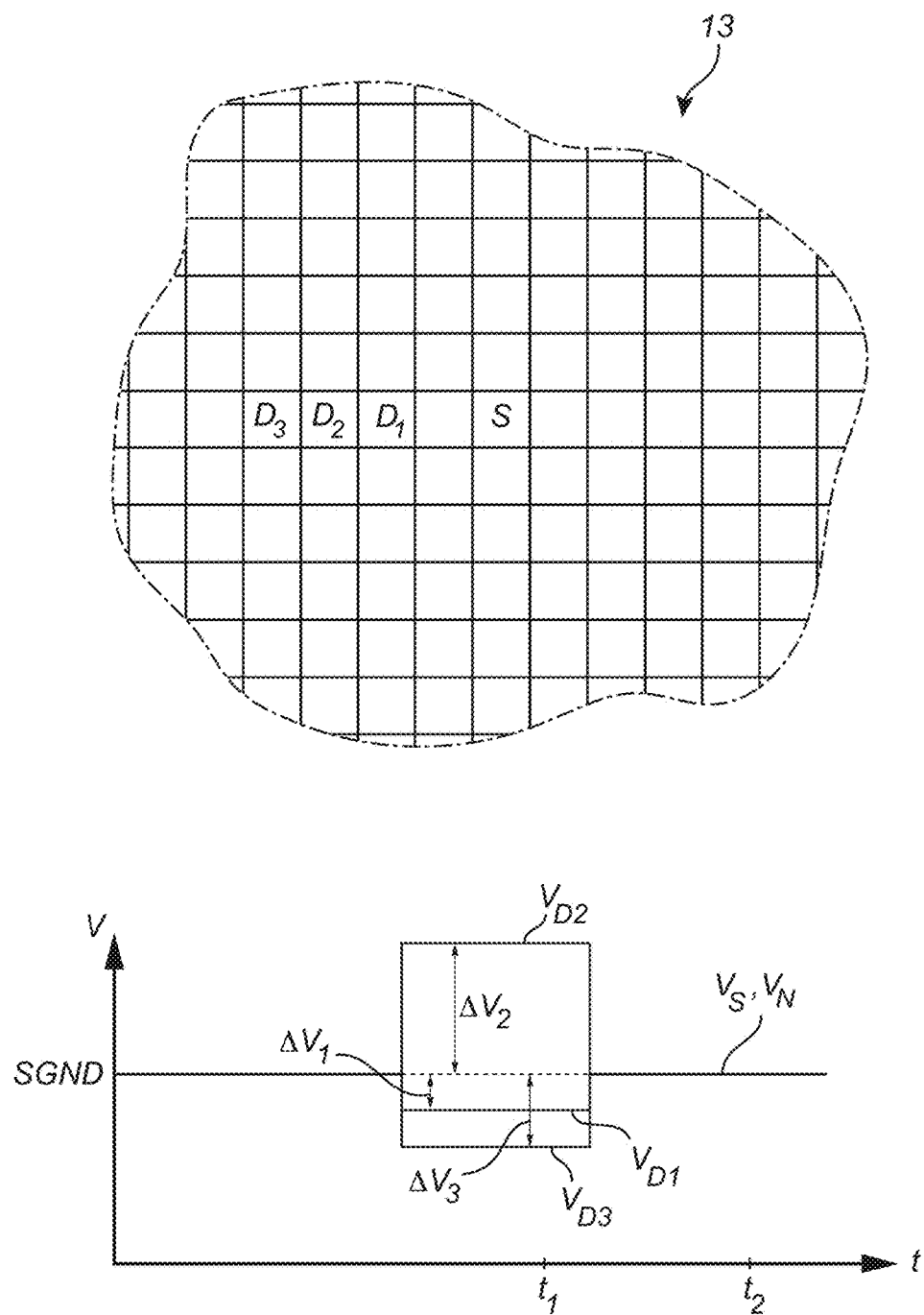
FIG. 5A schematically illustrates an example of a first measuring configuration providing a first voltage pattern.

In the measuring configuration, referring now also to FIG. 5A, which schematically shows a portion of the measuring arrangement 13 in FIG. 3A, the finger electrode of the sensing measuring element at the measuring element position n, indicated by S in FIG. 5A, exhibits a sensing finger electrode potential VS, the finger electrode of a first different measuring element, indicated by D1, exhibits a first different finger electrode potential VD1, the finger electrode of a second different measuring element, indicated by D2, exhibits a second different finger electrode potential VD2, and the finger electrode of a third different measuring element, indicated by D3, exhibits a third different finger electrode potential VD3.

The first different measuring element D1 is here spaced apart from the sensing measuring element S by a non-sensing measuring element indicated by an empty square in FIG. 5A. In the particular example of FIG. 5A, all other measuring elements in the vicinity (such as, say, within ten measuring elements) of the sensing measuring element S are also non-sensing measuring elements.

The finger electrode potential VS of the sensing measuring element S is indicated by the dashed line in FIG. 5A, and the finger electrode potentials VD1, VD2, and VD3 of the first D1, second D2 and third D3 different measuring elements, respectively, are indicated by solid lines in FIG. 5A.

As is schematically indicated in FIG. 5A, the sensing finger electrode potential VS is substantially constant, in relation to sensor ground, SGND. The first different finger electrode potential VD1 is time-varying in relation to SGND, and in the relation to the first finger electrode potential V1, so that there is a first potential difference ΔV1 between the finger electrode of the evaluated sensing measuring element S and the finger electrode of the first different measuring element D1. Similarly, the second different finger electrode potential VD2 and the third different finger electrode potential VD3 are also time-varying to provide second ΔV2 and third ΔV3 potential differences, respectively, in relation to the sensing finger electrode potential VS.

In the example measuring configuration of FIG. 5A, the first potential difference ΔV1 (defined as the VD1−VS) is negative, the second potential difference ΔV2 (defined as the VD2−VS) is positive, and the third potential difference ΔV3 (defined as the VD3−VS) is negative. Furthermore, the potential differences relate to each other as '−1', '+3', '−2', as is schematically indicated in FIG. 5A.

In the subsequent step 402, a measurement value is acquired, by the acquisition circuitry 17 from the measuring arrangement 13, based on a sensing signal from the evaluated sensing measuring element S. To reduce the occurrence of common mode noise, the, per se well-known, correlated double sampling technique may advantageously be used. Referring to FIG. 5A and FIG. 3B, a first sample of the sensing signal Vs is taken by the sample-and-hold circuitry 43 at a first sampling time t1, and a second sample of the sensing signal Vs is taken by the sample-and-hold circuitry 43 at a second sampling time t2. The difference between sampled values is converted to a digital first measurement value for measurement position n by the analog-to-digital converter 45.

When the above-described steps 401 and 402 have been carried out for all measurement positions in the measurement arrangement 13, by going through the loop defined additionally by steps 403 and 404, a complete fingerprint image has been acquired.

Figure 5B:
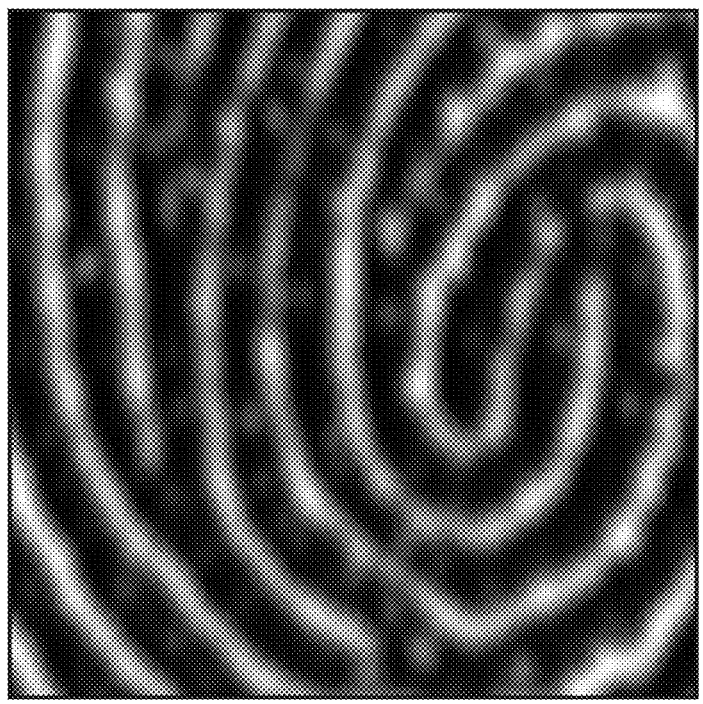
FIG. 5B is an illustration of an example simulated fingerprint image resulting from the first measuring configuration in FIG. 5A in which the finger electrodes are separated from the user's finger by a 300 µm cover glass.

FIG. 5B shows a fingerprint image 59 resulting from a simulation using the above-described measuring configuration. Apart from the measuring configuration used, all other simulation parameters are identical to those used for the simulation resulting in the fingerprint image 12 in FIG. 2B.

Figure 5C:
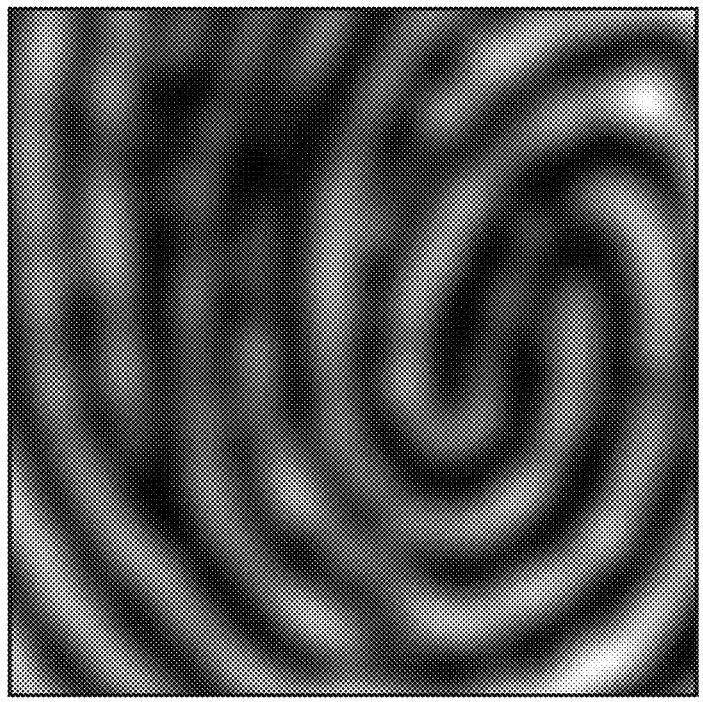
FIG. 5C is the same fingerprint image as in FIG. 2B for comparison.

Comparing the fingerprint image 59 in FIG. 5B with the fingerprint image 12 in FIG. 2B, which is repeated as FIG. 5C to facilitate comparison, it is clear that even a relatively simple voltage pattern such as that resulting from the measuring configuration described above with reference to FIG. 5A results in a considerably sharper simulated fingerprint image 65.

In this example, the physical property of the finger, which is determined, is a representation of the fingerprint of the finger. In particular, a sharpened fingerprint image is obtained. It should be noted that other measuring configurations, resulting in different voltage patterns, may be used to achieve an even sharper fingerprint image.

Furthermore, the physical property of the finger need not necessarily be the fingerprint image for use for enrolment or authentication, but the physical property may, for instance, alternatively be an indication of the distribution of moisture across the finger surface etc.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of determining a representation of a physical property of a finger using a finger sensing system comprising:
    a two-dimensional measuring arrangement including a plurality of measuring elements, each defining a measuring element position in said measuring arrangement, and each comprising a finger electrode spaced apart from said finger by a dielectric structure;
    acquisition circuitry for acquiring measurement values from said measuring arrangement; and
    control circuitry for controlling operation of said finger sensing system, said method comprising the steps of:
controlling, for each of said measuring element positions using said control circuitry, said measuring arrangement to provide a measuring configuration in which:
the finger electrode of a sensing measuring element defining said measuring element position exhibits a sensing finger electrode potential, and said measuring arrangement provides a sensing signal indicative of a charge on the finger electrode of said sensing measuring element;
the finger electrode of a first different measuring element at a first lateral distance from said measuring element position exhibits a first different finger electrode potential to provide a first potential difference between said sensing finger electrode potential and said first different finger electrode potential; and
the finger electrode of a second different measuring element at a second lateral distance, greater than said first lateral distance, from said measuring element position exhibits a second different finger electrode potential to provide a second potential difference, different from said first potential difference, between said sensing finger electrode potential and said second different finger electrode potential;
acquiring for each of said measuring element positions, using said acquisition circuitry, a measurement value based on the sensing signal provided by said measuring arrangement, resulting in a plurality of measurement values; and
determining the representation of the physical property of said finger based on said plurality of measurement values.

2. The method according to claim 1, wherein, in said measuring configuration:
the finger electrode of any additional measuring element closer to said sensing measuring element than said first different measuring element exhibits said sensing finger electrode potential.

3. The method according to claim 1, wherein, in said measuring configuration:
the finger electrode of a third different measuring element at a third lateral distance, greater than said second lateral distance, from said measuring element position exhibits a third different finger electrode potential to provide a third potential difference, different from said second potential difference, between said sensing finger electrode potential and said third different finger electrode potential.

4. The method according to claim 1, wherein, in said measuring configuration:
the finger electrode of each of a plurality of first different measuring elements at said first lateral distance from said measuring element position exhibits said first different finger electrode potential to provide said first potential difference between said sensing finger electrode potential and said first different finger electrode potential.

5. The method according to claim 1, wherein, in said measuring configuration:
the finger electrode of each of a plurality of second different measuring elements at said second lateral distance from said measuring element position exhibits said second different finger electrode potential to provide said second potential difference between said sensing finger electrode potential and said second different finger electrode potential.

6. The method according to claim 1, wherein, in said measuring configuration:
at least one of said sensing finger electrode potential, said first different finger electrode potential and said second different finger electrode potential is time-varying in such a way that each of said first potential difference and said second potential difference is time-varying.

7. The method according to claim 6, wherein:
said first potential difference is time-varying from being a first potential difference value at a first point in time to being a second potential difference value at a second point in time; and
the step of acquiring, for each measuring element position, said measurement value comprises sampling said sensing signal at said first point in time, and sampling said sensing signal at said second point in time.

8. The method according to claim 1, wherein said first potential difference has a first polarity, and said second potential difference has a second polarity, opposite to said first polarity.

9. The method according to claim 8, wherein, in said measuring configuration:
the finger electrode of a third different measuring element at a third lateral distance, greater than said second lateral distance, from said measuring element position exhibits a third different finger electrode potential to provide a third potential difference, different from said second potential difference, between said sensing finger electrode potential and said third different finger electrode potential,
wherein said third potential difference has said first polarity.

10. The method according to claim 1, wherein the physical property of said finger is a representation of a fingerprint pattern of said finger.

11. A finger sensing system for determining a physical property of a finger, said finger sensing system comprising:
a two-dimensional measuring arrangement including a plurality of measuring elements, each defining a measuring element position in said measuring arrangement, and each comprising a finger electrode spaced apart from said finger by a dielectric structure;
control circuitry connected to said measuring arrangement for:
controlling, for each of said measuring element positions, said measuring arrangement to provide a measuring configuration in which:
the finger electrode of a sensing measuring element defining said measuring element position exhibits a sensing finger electrode potential, and said measuring arrangement provides a sensing signal indicative of a charge on the finger electrode of said sensing measuring element;
the finger electrode of a first different measuring element at a first lateral distance from said measuring element position exhibits a first different finger electrode potential to provide a first potential difference between said sensing finger electrode potential and said first different finger electrode potential; and the finger electrode of a second different measuring element at a second lateral distance, greater than said first lateral distance, from said measuring element position exhibits a second different finger electrode potential to provide a second potential difference, different from said first potential difference, between said sensing finger electrode potential and said second different finger electrode potential; and acquisition circuitry connected to said measuring arrangement for:
  acquiring for each of said measuring element positions, a measurement value based on the sensing signal provided by said measuring arrangement, resulting in a plurality of measurement values; and
  determining the representation of the physical property of said finger based on said plurality of measurement values.

12. The finger sensing system according to claim 11, wherein each measuring element in said measuring arrangement comprises:
  a charge amplifier comprising:
    a first input;
    a second input;
    an output capacitively coupled to said first input; and
    at least one amplifier stage between said first and second inputs, and said output.

13. The finger sensing system according to claim 11, wherein said dielectric structure includes a dielectric plate, such as a glass plate.

14. An electronic device comprising:
  the finger sensing system according to claim 11; and
  processing circuitry connected to said finger sensing system for:
    acquiring a representation of a fingerprint pattern from said finger sensing system;
    authenticating a user based on said representation; and
    performing at least one user-requested process only if said user is authenticated based on said representation.

* * * * *